UNITED STATES PATENT OFFICE.

LUIGI LOMBARDI, OF TURIN, ITALY.

PROCESS OF MANUFACTURING THIN HOMOGENEOUS PLATES.

SPECIFICATION forming part of Letters Patent No. 661,250, dated November 6, 1900.

Application filed May 18, 1900. Serial No. 17,171. (No specimens.)

*To all whom it may concern:*

Be it known that I, LUIGI LOMBARDI, a subject of the King of Italy, residing at Via San Quintino, Turin, Italy, have invented an Improved Process of Manufacturing Thin Homogeneous Plates, more particularly applicable for use in electrical condensers, of which the following is a specification.

This invention relates to a process for the manufacture of parallel and homogeneous plates from substances to which the processes hitherto employed are not readily applicable.

According to this invention the substance employed should be easily fusible and should have low specific gravity in order that it may float in a liquid state upon the surface of another liquid at a suitable temperature. The point of fusion should therefore not be below that of this latter liquid nor higher than its point of vaporization.

The novel process consists in melting the substance in question and in pouring it upon the surface of another suitably-heated liquid. It is of course necessary that the specific gravity of this latter liquid should be higher in order that it may not mingle with the substance in question. It is also requisite that it may not be able to form a chemical combination therewith. Upon the temperature being allowed to fall gradually the substance which is upon the top congeals, while the lower substance remains liquid. The plate which is thus obtained possesses perfectly smooth and parallel surfaces and is readily separable from the liquid, this separation having been very difficult to effect in the case of plates of very small thickness when other processes of fusion or casting are employed.

The selection of the liquid serving as the base depends principally upon the substance to be treated. For this purpose may be used simple metals or metallic alloys or even liquid substances, providing that their density, fusing-point, and ebullition-point are adapted to the object in view.

This process may advantageously be employed, for example, in the manufacture of thin insulating-plates for the construction of electrical condensers.

Mercury may be employed, for example, as the liquid base, while as the dielectric substance paraffin, ozokerite, wax, or other substance which fuses readily and is a bad conductor may be employed, or any suitable mixture of substances of this nature may be used, provided they possess good dielectric properties. It is essential that plates for use for this purpose must be exceedingly thin and perfectly homogeneous, and as heretofore considerable difficulty has been experienced in their manufacture by other processes my improved method offers a ready and convenient process for their production.

Having now particularly described and ascertained the nature of my said invention and in what manner the same is to be performed, I declare that what I claim is—

1. The process for the manufacture of thin homogeneous plates consisting in spreading fusible substances upon a suitable liquid base, and subsequently cooling the plates and removing them from the said base, substantially as hereinbefore described.

2. The herein-described process of preparing dielectric plates for high-tension condensers consisting in spreading a fused insulating material upon a liquid base, cooling until said fused insulating material is hardened, and finally removing said hardened layer, substantially as described.

In witness whereof I have hereunto set my hand in presence of two witnesses.

LUIGI LOMBARDI.

Witnesses:
 FELICE BAZETTA,
 MARIO CAPUCCIO.